April 5, 1932.     J. W. LEIGHTON     1,852,320
BEARING FOR SPRING SUPPORTS
Filed Sept. 3, 1931     2 Sheets-Sheet 1
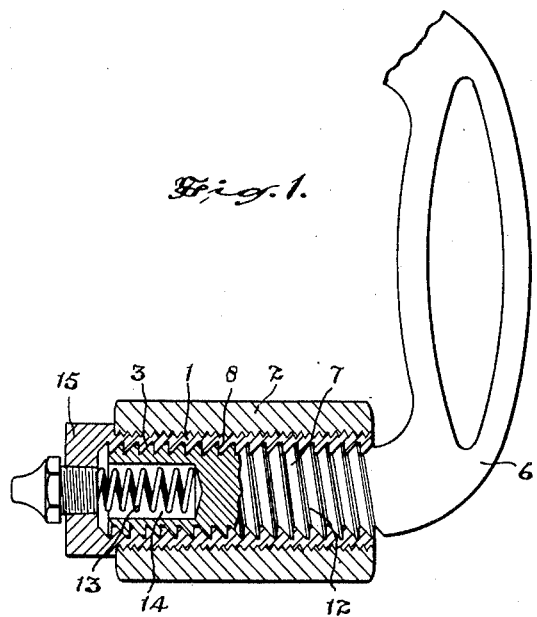
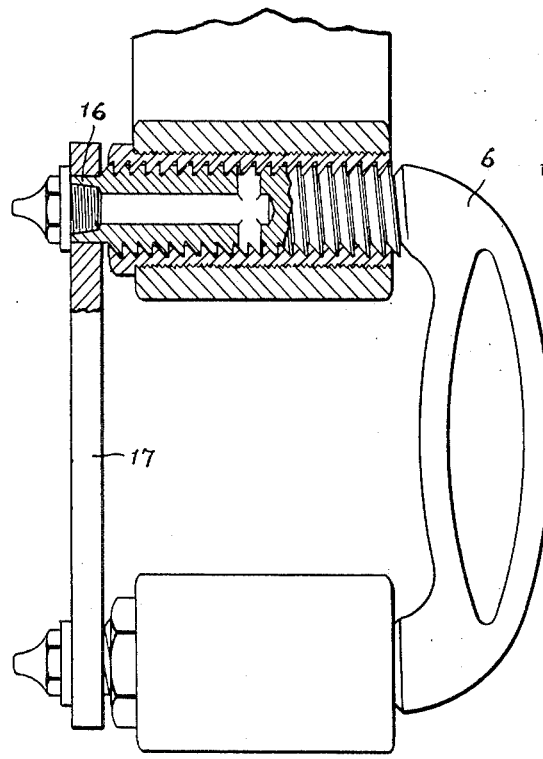
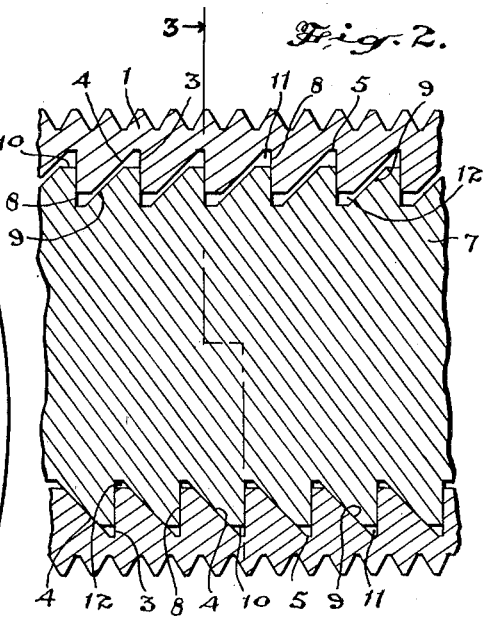

April 5, 1932.  J. W. LEIGHTON  1,852,320
BEARING FOR SPRING SUPPORTS
Filed Sept. 3, 1931   2 Sheets-Sheet 2

Inventor.
John Wycliffe Leighton.
by H. J. S. Dennison
atty

Patented Apr. 5, 1932

1,852,320

UNITED STATES PATENT OFFICE

JOHN WYCLIFFE LEIGHTON, OF PORT HURON, MICHIGAN

BEARING FOR SPRING SUPPORTS

Application filed September 3, 1931. Serial No. 560,896.

The principal objects of this invention are to introduce a frictional resistance to the turning of a shackle pin in relation to its bearing in the movable element so that the flexible feature of the joint will not be too sensitive.

It has been found that the threaded type of bearing for spring supports is highly desirable for a number of reasons as the actual wearing surface is materially increased, end play in the shackle pin is eliminated and side play of the shackle members avoided, thus ensuring longer life through greater wearing surface and better lubrication and freedom from objectionable sounds caused by the rubbing of unlubricated surfaces.

It has been found however, that with certain types of spring suspension, the use of a threaded bearing is too flexible and the present invention has been devised to overcome this difficulty.

The principal feature of the invention consists in the application of a longitudinal thrust in the threaded bearing members to provide the desired frictional contact between the engaging threaded surfaces whereby too great a flexibility in the joint is obviated.

In the accompanying drawings Figure 1 is a part sectional elevation of a spring shackle illustrating the application of the present invention.

Figure 2 is an enlarged longitudinal sectional detail showing the arrangement of the co-operating surfaces of the shackle bolt and bushing.

Figure 4 is an elevational part sectional view showing a further modified construction of a bushing and shackle.

Figure 3:
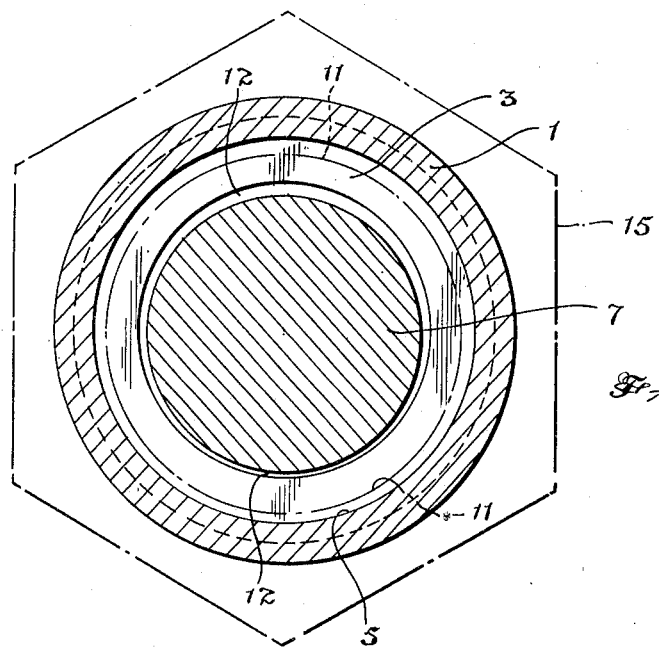
Figure 3 is a cross section on the line 3—3 of Figure 2.

In the use of internally threaded bushings or supporting blocks for spring suspension it is of course necessary that the threaded fastening pin or bolt be more or less loose or rotatable and with this condition existing the load presses the threaded surfaces of the pin and bushing into engaging contact along a limited area on the underside, theoretically along a line, and the threads toward the upper side of the bolt are clear of the threads of the bushing or vice versa, in accordance with the manner of suspension of the load.

With this limited area of contact the wear is not distributed over as large an area as is desirable and the frictional contact is reduced to the minimum with the consequence that the pin turns very readily within the bushing and such a condition is in many instances conducive to too free a movement, which in the case of fast-moving vehicles, may create a tendency to sway.

The present invention aims to overcome this condition in such a manner that the frictional resistance within the bushing may be definitely determined and limited. The preferable means of overcoming this difficulty is illustrated in the accompanying drawings and is shown particularly in Figures 2 and 4. This is accomplished by the use of a buttress-type of thread, that is, a thread with one face of the groove arranged at a right angle to the axis of the bushing and pin and the other face of the groove arranged at an acute angle to the other face.

The result of this construction is, that when the load is applied, the bevelled or tapering face of the thread of one member engages the correspondingly bevelled face of the other member and these engaging faces slip on each other until the faces perpendicular to the axis of the pin engage the faces perpendicular to the axis of the bushing. This creates direct longitudinal thrust between the meeting perpendicular faces and the friction is thus in direct ratio to the load and extends throughout the length of the thread of the engaging members.

It will be readily understood that by varying the angularity of the double faces of the threads, a variation in the amount of the longitudinal thrust may be made.

The threads are cut so that a recessed portion of the groove is not filled by the apexes of the threads of the adjacent member.

In reference to the accompanying drawings, the bushing 1 is shown threaded externally to be secured in the spring end, block or fitting 2 and the internal thread of the bushing is formed with the faces 3 perpendicular to the axis thereof and the faces 4 are arranged at an acute angle to the faces 3, in the present instance at an angle of about 45°. The bottom 5 of the threads are formed with a slight flat. The shackle 6 is here shown of the forged U-type having a pair of threaded ends 7.

The thread grooves of the portions 7 are substantially the same as the thread grooves of the bushing having the faces 8 perpendicular to the axis and the faces 9 set at an angle corresponding with the angle of the faces 4. The tops 10 of these threads are flattened so that they will not extend to the bottom of the thread grooves of the bushing. This forms a spiral chanel 11 at the root of the threads in the bushing and a spiral channel 12 at the root of the threads of the shackle for clearance and for the reception and distribution of a lubricant.

It will be readily understood that when the load is placed on the bushing the internal threads thereof will fit snugly into the external threads of the shackle on the top side and the perpendicular sides of the bushing threads engage the perpendicular faces 8 of the shackle threads, while the angle faces 4 of the bushing threads engage the angle faces 9 of the shackle threads.

The engagement of the latter faces produces an end thrust between the shackle and the bushing towards a straight or perpendicular face and a friction is set up which prevents too free movement of the shackle and this friction extends throughout the entire length of the bushing thread and extends completely around the circle as the surfaces are, as prevously described perpendicular to the axis.

Alteration of the angle of the faces 4 and 9 will increase or decrease the frictional end thrust. The frictional end thrust may be augmented if desired by the introduction of a spring element between the threaded shackle member and the bushing and in the construction shown a spiral compression spring 13 is housed within a recess 14 bored in the end of the shackle bolt. The spring is compressed against the bottom end of the bushing recess and may be of any desirable strength to create the desired end thrust.

Figure 5:
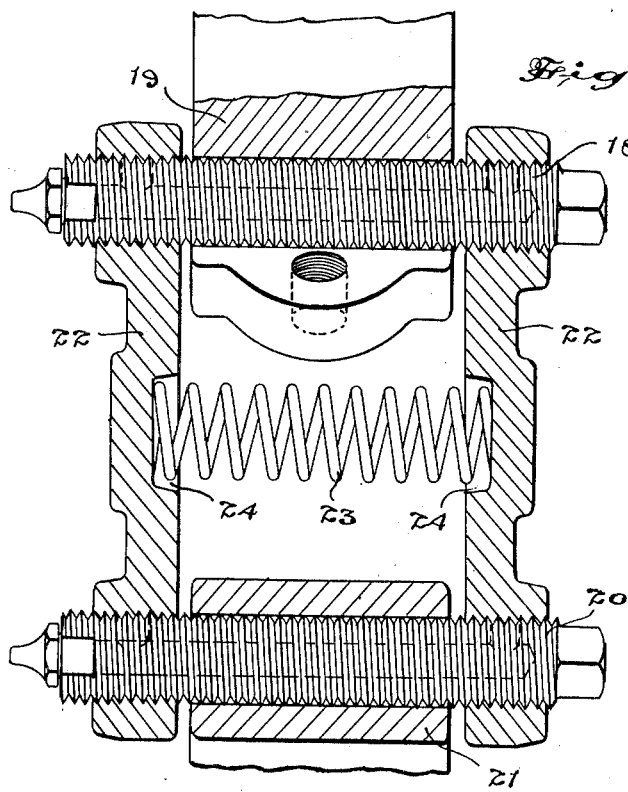
Figure 5 is a sectional detail showing the application of a spring to a double bar shackle member with threaded bearings.
Figure 6:
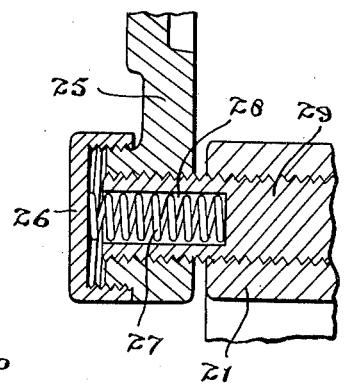
Figure 6 is a sectional detail of a further modified application of the spring thrust element.

In the practical application of this invention the buttress type of thread is preferable, but, and it will be appreciated, that the ordinary V-type of Whitworth thread may be used in conjunction with the end-thrusting spring element to accomplish the desired result. An application of this feature is illustrated in Figures 5 and 6. In Figure 5 the threaded shackle pin 18 is held from turning in the frame end 19 and the pin 20 is non-rotatably secured in the spring eye 21. The shackle bars 22 are rotatably threaded on to the projecting ends of the pins 18 and 20 and a coiled compression spring 23 is arranged between the bars 22 intermediate of their length, the ends being retained in recesses 24. The outward thrust of the spring housed between the bars forces them outwardly so that the thread surfaces engage with a thrust in a direction longitudinal of the pins and a frictional contact is created to check the otherwise free rotation of the bars 22 on the pins.

Also in Figure 6, the bearing bar 25 is provided with a cap 26 which engages the outer end of a coiled compression spring 27 housed in a recess 28 in the end of the shackle pin 29. The spring imparts an end thrust between the bearing threads of the bar 25 and the shackle 29.

It will be noted that the bushing is shown externally threaded as well as internally threaded and the external thread which is much finer than that of the internal thread is double and of the same pitch as the internal thread so that the bushing may be threaded into the frame bracket or spring eye concurrently with being threaded on to the shackle or fastening bolt, the bushing being preferably made with a nut-shaped end 15 to enable its being turned into position.

It may be found desirable in some instances with shackles of the D shape to couple the inner ends of the shackle bolts as shown in Figure 4. The extremities 16 of the shackle bolts are turned down to the diameter of the bottom of the thread or less and a coupling bar 17 is placed on the reduced ends and secured in position by a suitable nut which is here shown in the form of a lubricant fitting.

What I claim as my invention is:—

1. A bearing for spring supports, comprising a pair of members each having opposing thread surfaces capable of transmitting end thrust, and means for imparting a positive end thrust in one direction to said members to create a defined frictional contact to restrict the movement of said members.

2. A bearing for spring supports, comprising a load support having a bearing member formed with an internal buttress type thread, and a shackle member externally threaded and rotatably engaging the internal thread of the aforesaid member.

3. In a bearing for spring supports, a hollow member threaded internally with a thread having one face perpendicular to the axis and the other face arranged at an acute angle to the axis, and a member threaded externally and adapted to rotate in the aforesaid member having its thread a rotating fit therein with the perpendicular faces engaging the perpendicular faces of the hollow member, and the acute angled faces engaging and exerting an end thrust between the members.

4. In a bearing for spring supports, a hollow member threaded internally, a member threaded externally and rotatably mounted therein each having faces adapted to receive end thrust, and a spring arranged between said members and exerting an end thrust therebetween.

5. In a bearing for spring supports, a hollow member threaded internally, a member threaded externally and rotatably mounted therein each having faces adapted to receive end thrust, and a spring arranged in axial relation to the said members and exerting an end thrust therebetween.

6. In a bearing for spring supports, the combination with a load supporting member, of a shackle member having an externally threaded bearing surface, and a bushing formed with a threaded bearing surface to engage said shackle in rotative bearing engagement and having an external thread of a pitch corresponding to the pitch of the internal thread and adapted to thread into the load supporting member.

7. In a bearing for spring supports, a member threaded externally, a bushing rotatively threaded on to said member and having its outer surface threaded with a multiple thread of the same pitch as the inner thread, and a load supporting member engaging the outer threaded surface of said bushing.

JOHN WYCLIFFE LEIGHTON.